United States Patent [19]

Carpenter et al.

[11] Patent Number: 5,014,183

[45] Date of Patent: May 7, 1991

[54] METHOD AND MEANS FOR PATH OFFSETS MEMORIZATION AND RECALL IN A MANIPULATOR

[75] Inventors: Kurtis R. Carpenter; Joseph W. Schnelle, both of Greenwood City, S.C.

[73] Assignee: Cincinnati Milacron, Inc., Cincinnati, Ohio

[21] Appl. No.: 264,350

[22] Filed: Oct. 31, 1988

[51] Int. Cl.[5] .............................................. G06F 15/46
[52] U.S. Cl. ................................ 364/167.01; 364/513; 318/568.19
[58] Field of Search ................... 364/167.01, 192, 193, 364/474.18, 474.35, 513; 318/568.19; 901/42; 219/124.34, 125.1, 125.12

[56] References Cited

U.S. PATENT DOCUMENTS

| | | | |
|---|---|---|---|
| 4,244,501 | 9/1980 | Lindbom et al. | 219/124.34 |
| 4,403,281 | 9/1983 | Holmes et al. | 364/170 |
| 4,433,382 | 2/1984 | Cunningham et al. | 364/474 |
| 4,508,953 | 4/1985 | Murakami et al. | 219/125.1 |
| 4,568,816 | 2/1986 | Casler Jr. | 219/124.34 |
| 4,590,355 | 5/1986 | Nomura et al. | 219/125.12 |
| 4,635,206 | 1/1987 | Bhatia et al. | 364/474 |
| 4,685,067 | 8/1987 | French et al. | 364/513 |
| 4,742,207 | 5/1988 | Nakashima et al. | 219/125.1 |
| 4,803,640 | 2/1989 | Mitomi et al. | 364/513 |

Primary Examiner—Jerry Smith
Assistant Examiner—Paul Gordon
Attorney, Agent, or Firm—Frost & Jacobs

[57] ABSTRACT

A method and means for memorizing path deviations of a manipulator arm, and recalling the same deviations to adjust succeeding passes. During the seam-tracking pass, any feature or sensor system can be used which will cause the manipulator supported tool to deviate from the programmed path of travel. Offsets generated during the initial seam-tracking paths are memorized and thereafter recalled so that the manipulator arm can perform subsequent passes along the seam with the seam-track function off. While seam-tracking, the offsets are automatically memorized at distinct preprogrammed offset distance intervals. Each offset is placed sequentially in a memory data table. The offsets are recalled during a subsequent pass at each offset distance interval at which they were memorized so that the subsequent pass has the same deviations as the initial seam-tracked pass. Subsequent passes can be executed in the same direction as the initial seam-tracking pass, or in the opposite direction. In the first instance, offsets are recalled from the memory data table in a first-in, first-out basis. In the second instance, the offsets are recalled in a first-in, last-out basis.

10 Claims, 11 Drawing Sheets

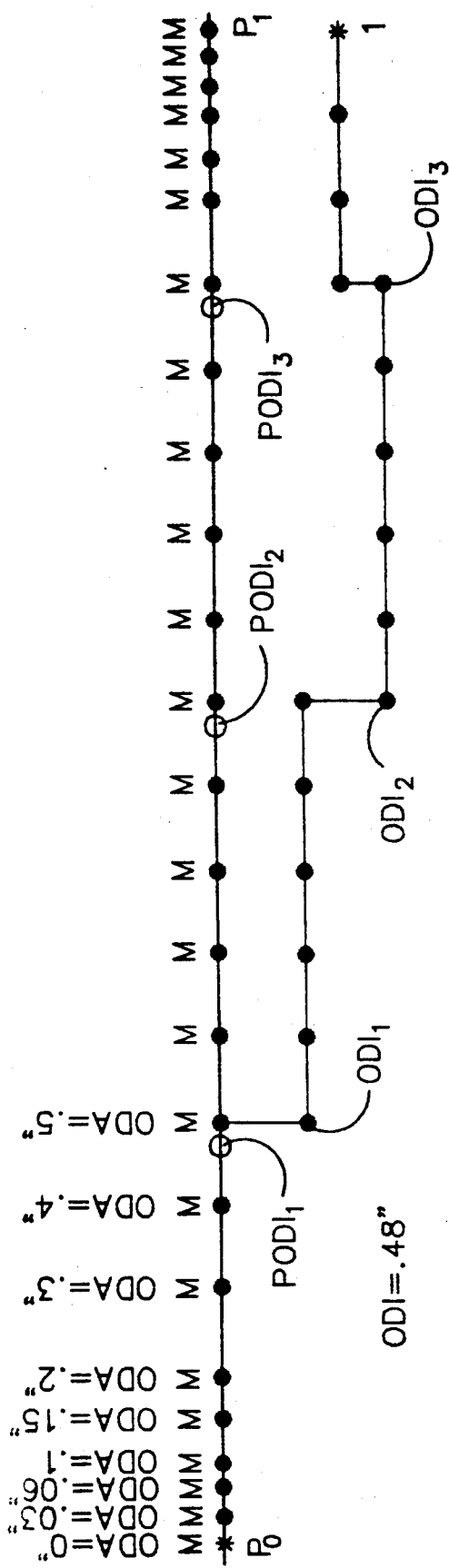
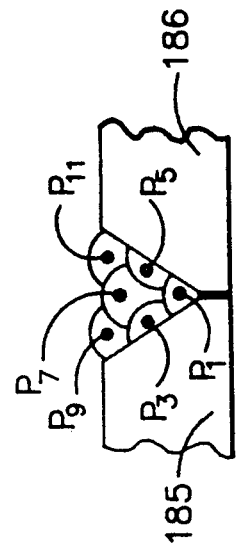
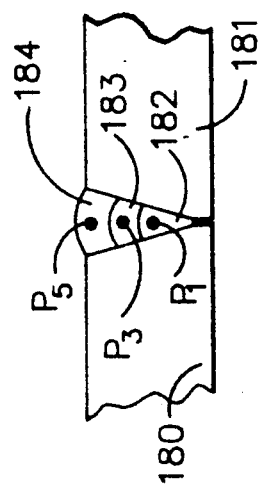
FIG. 16
FIG. 19
FIG. 18

| OFFSET INTERVAL POSITIONS (INDEX) | ΔS DISTANCE INTERVAL | X COORD. | Y COORD. | Z COORD. | SPECIAL ODI |
|---|---|---|---|---|---|
| 1 | .5 | 0 | 0 | .2" | |
| 2 | .5 | 0 | 0 | .4" | |
| 3 | .5 | 0 | 0 | .3" | |
| 4 | | | | | |
| 5 | | | | | |
| 6 | | | | | |
| 7 | | | | | |

FIG. 17

METHOD AND MEANS FOR PATH OFFSETS MEMORIZATION AND RECALL IN A MANIPULATOR

TECHNICAL FIELD

The invention relates to a method and means for recording the dynamic compensations created by a sensor or the operator in a manipulator's programmed path of travel, and more particularly to such a method and means which will also recall those compensations to perform succeeding passes.

BACKGROUND ART

In its most usual form, a robot or manipulator comprises a series of arm segments terminating in a wrist assembly. The wrist assembly supports a face plate to which an appropriate tool is affixed. The nature of the tool will depend upon the work to be performed by the manipulator.

The manipulator is provided with a control. The control is programmed to cause the manipulator to move the tool along a programmed path of travel and to execute programmed functions associated with programmed locations along that path of travel.

In order for the manipulator to perform operations correctly, it is necessary that the manipulator move the designated center point of the tool accurately along the programmed path of travel. Some operations require greater accuracy than others. Examples of operations requiring particular accuracy include sealant application, contour mapping, deburring and welding. While not intended to constitute a limitation, the present invention, for purposes of an exemplary showing, will be described in its application to welding operations.

Once a manipulator is taught a program, it will move along the programmed path with high repeatability. While this is satisfactory for many applications, those operations of the type mentioned above and needing particular accuracy will require adaptive path control. For example, in a welding operation, if the parts being joined are not uniform in seam or joint location by virtue of manufacturing tolerances, heat distortion, shifting of the clamping fixture for the parts, or the like, the manipulator will weld along its taught path, even though the seam may be located elsewhere.

Prior art workers have devised a number of systems for adaptive path control. Each system involves some sort of sensor. One system constitutes a pendant controlled root or initial pass wherein the operator creates deviations from the taught path of manipulator arm travel by eye and through the use of a pendant. This system is relatively slow and depends on the skill of the operator. A forced torque pressure tracking technique is known in the art, as well as a through-the-arc seam tracking system requiring that the seam be characterized by opposing sidewalls which are contacted by the tool center point (i.e., the tip of the welding tool) which traverses a weaving path. This weaving tracking imposes limitations on the welding speed. Yet another system is taught in copending application serial number 07/179,505, filed Apr. 8, 1988 in the names of Gregory Webb and Keith R. Wehmeyer and entitled VISION SEAM TRACKING METHOD AND APPARATUS FOR A MANIPULATOR. This system employs a laser scanner/camera head which previews the seam to be welded ahead of the welding torch. Data from the vision system is used to alter the manipulator's preprogrammed path of travel.

A problem which plagues the welding industry lies in the fact that many welding operations require successive weld passes to be made on the same seam. Thus, each pass must be seam-tracked, adding to the weld time required. In many instances seam-tracking cannot be performed over a weld bead. In addition, applications exist wherein the space provided will not accommodate the tracking equipment and the welding torch at the same time. Thus, a method and means are needed whereby the tracking equipment alone can be used to do an initial dry run or root pass determining the proper offset path of travel, followed by successive passes with the welding torch only, performing the welding operation based on the data observed in the initial seam-tracked pass. Even in those instances where no space problem exists, if an initial seam-tracked pass could be made (with or without concurrent welding), followed by successive welding passes without seam-tracking and based on the data observed in the seam-tracked pass, the multi-pass welding operation could be simplified, accomplished more quickly, and performed with less chance of damage to the seam-tracking equipment.

The present invention is based upon the development of a new feature enabling the manipulator operator to memorize the offsets generated during an initial seam-tracking pass, controlling the rate at which the offsets are accumulated. Thereafter, without the use of a seam-tracking system, the operator can recall the offsets on successive passes executed in the same direction as the initial seam-tracked pass or in a direction opposite to that of the seam-tracked pass. Thus, for example, alternate passes can be executed in the opposite direction, if desired. This new feature, with the aid of existing taught point offset registers (or the equivalent) enables the manipulator to perform multipass welding requiring some form of seam-tracking only on the initial or root pass. The present invention provides the manipulator operator with an exceptional degree of flexibility for both memorizing and recalling the offsets generated either manually or by means of a sensor or seam-tracking system.

DISCLOSURE OF THE INVENTION

According to the invention there is provided a method and means for memorizing path deviations of a manipulator arm, and recalling the same deviations to adjust succeeding passes. Offsets generated during an initial seam-tracked pass are stored and thereafter recalled so that the manipulator arm can perform subsequent passes along the seam with the seam-track function off.

While seam-tracking, the offsets are automatically memorized at distinct preprogrammed offset distance intervals. Each offset is placed sequentially in a memory data table. When the manipulator arm reaches a path offsets OFF point, memorizing of the offsets ceases. The path offsets are recalled by executing a path offsets recall point, the seam-tracker having been turned off.

The present invention will work during the seam-tracking pass with any feature or sensor system which will cause the manipulator supported tool to deviate from the programmed path of travel.

The path offsets are memorized by executing a path offsets memorization point, the seam tracking feature or sensor system having been turned off. The offsets are recalled at each offset distance interval at which they were memorized so that the subsequent pass has the same deviations as the initial seam-tracked pass.

The velocity of the passes can be modified without creating significant error in the offset distance intervals. The manipulator operator can cycle through as many learning passes as needed. The velocity of these passes can be moderately slow to allow accurate offsets to be memorized. During subsequent passes without seam tracking the operator can increase the velocity, greatly reducing welding time.

The subsequent passes, following the initial seam-tracked pass, can be executed in the same direction as the initial seam-tracked pass, or in the opposite direction. In the first instance, offsets are recalled from the memory data table on a first-in, first-out basis. In the second instance the offsets are recalled on a first-in, last-out basis.

As will be described hereinafter, the path offsets user program enables the manipulator operator to reset the pointer to the path offsets table; to clear or delete the table; to maintain the table; and to save the index position if an interruption should occur and resume if the manipulator is restarted at the same position.

Finally, the offset distance interval, selected by the operator, can be changed at any program point, as will be described hereinafter.

BRIEF DESCRIPTION OF THE DRAWINGS

FIG. 16 is a diagrammatic representation of path offsets.

FIG. 17 is a chart-like representation of the offsets memory data table.

FIGS. 18 and 19 are end elevational views of seams illustrating point offsets.

DETAILED DESCRIPTION OF THE INVENTION

Figure 1:
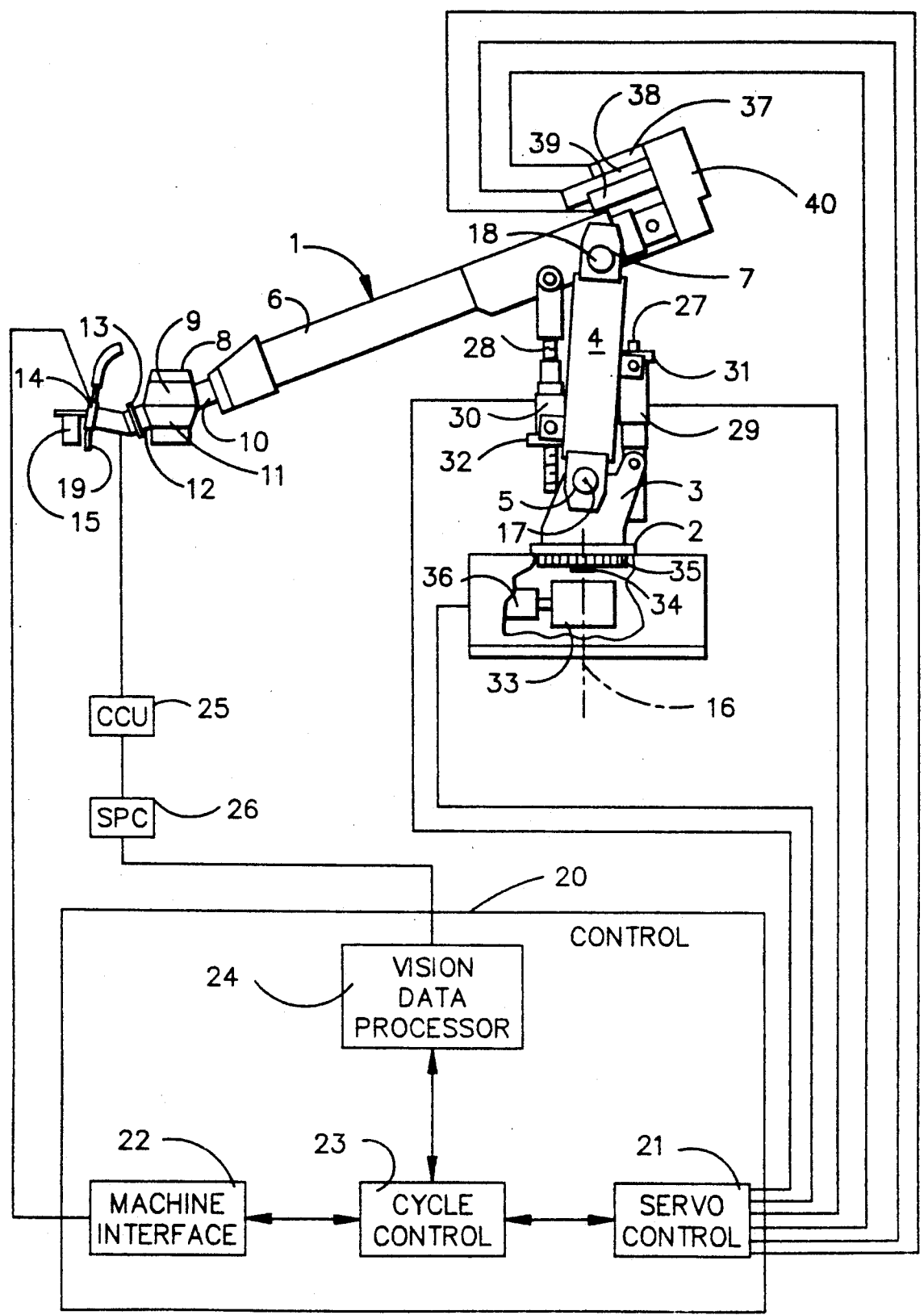
FIG. 1 is a simplified, diagrammatic representation of an industrial manipulator and its control.

For a thorough understanding of the vision guided seam tracking method and apparatus of the present invention, it will be necessary to describe an exemplary manipulator and its control. To this end, FIG. 1 illustrates a manipulator corresponding to those manufactured by Cincinnati Milacron, Inc., the assignee of the present invention. The manipulator shown is exemplary only, and the present invention may be applied to any appropriate manipulator. While the detailed description of the preferred embodiment will necessarily reflect the actual implementation, such detail should not be construed as limitations on the present invention as defined in the appended claims.

Referring to FIG. 1, an exemplary robot or manipulator is generally indicated at 1. The manipulator 1 comprises a plate 2 supporting an upstanding shoulder member 3. An upper arm 4 is pivotally affixed to shoulder member 3 at pivot 5. A forearm 6 is pivotally attached to upper arm 4 at pivot 7.

At its free forward end, the forearm 6 supports a wrist 8. As is known in the art, the wrist 8 comprises a first segment 9 having an integral shaft portion 10 rotatably supported within forearm 6 and having an axis parallel to or coincident with the longitudinal center line of forearm 6. Wrist 8 further comprises a second segment 11 rotatively mounted on first segment 9 and having an integral shaft Portion 12. The shaft 12 terminates in a face plate 13. Affixed to face plate 13 there is an exemplary tool in the form of a welding tool 14 and a seam tracking assembly. For purposes of an exemplary showing, the laser scanner/camera head 15 of the vision system of the above noted copending application is shown, although, as indicated above, the present invention can be used with offsets generated manually or by any appropriate seam-tracking sensor.

The manipulator 1 is so constructed that motion of its members describe axes of rotation. The first axis is the vertical base axis shown in broken lines at 16 and defined by rotation of plate 2 and shoulder member 3. The upper arm 4 rotates about horizontal shoulder axis 17 through the center of pivot 5. The forearm 6 rotates about the horizontal elbow axis 18 extending through the center of pivot 7.

Wrist 8 provides three more axes of rotation. The first is rotation of segment 9 about the axis of shaft 10. The second is rotation of segment 11 about an axis perpendicular to the abutting surfaces of segments 9 and 11. The third comprises the axis about which face plate 13 rotates, which axis is perpendicular to the face plate.

Rotations about base axis 16, shoulder axis 17 and elbow axis 18 define the operating envelope of the center point 19 of tool 14. Rotations of wrist segment 9, wrist segment 11, and face plate 13 about their respective axes control orientations of the tool 14 and laser scanner/camera head 15 at the programmed locations in accordance with programmed orientation angles.

The manipulator control is diagrammatically indicated at 20. Each of the six axes of motion is servo controlled by connection of command and feed back signals to servo control 21 of control 20. Operation of welding tool 14 is accomplished by a machine interface 22 which responds to the programmed cycle of operation controlled by the cycle control 23. The cycle control 23 operates upon stored location, velocity and function data to produce control signals for the servo control 21 and the machine interface 22. In this particular exemplary instance, the tool 14 is a welding torch and control of the welding process is effected through the machine interface in response to stored function signals. Control 20 also incorporates a vision data processor 24 which receives information from the vision system comprising the laser scanner/camera head 15, a camera control unit 25 and a signal processing computer 26. The vision system will be further described hereinafter.

Rotations of the upper arm 4 and the forearm 6 about their respective axes are achieved by linear motions of screws 27 and 28 through nuts 29 and 30, respectively. Rotation of the nuts 29 and 30 is imparted through pulleys 31 and 32, respectively, by drive motors not shown. Rotation of plate 2 and shoulder member 3 is accomplished through transmission 33 driving pinion 34 which, in turn, drives ring gear 35 affixed to plate 2. The drive to transmission 33 is provided by motor 36.

Rotation of wrist segments 9 and 11 and face plate 13 is accomplished through torque tubes (not shown) within forearm 6 and driven by motors 37, 38 and 39 through transmission 40. Position signals for each movable manipulator member are produced by position transducers (such as resolvers) which may be mechanically driven by motion of the manipulator movable members, themselves, or the drive motors therefor.

Figure 2:
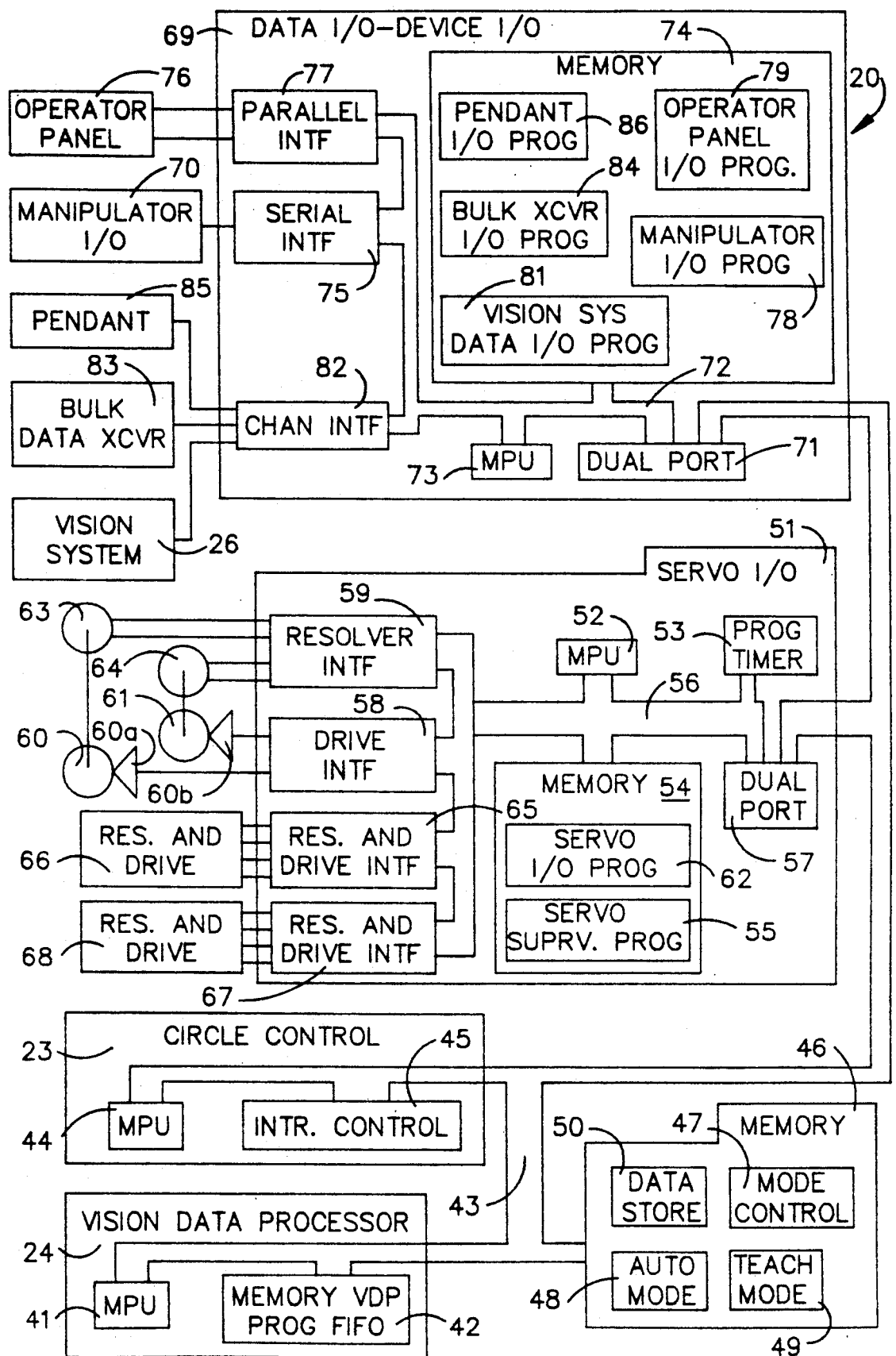
FIG. 2 is a block diagram of the control of FIG. 1.

Reference is now made to FIG. 2 which constitutes a block diagram for the control 20 of FIG. 1. The control 20 is implemented using a plurality of microprocessors communicating through a common bus. Applicants have chosen the commercially available 80186 microprocessor produced by Intel Corporation. It will be understood by those skilled in the art that other appropriate general purpose digital computers could be used to implement the control algorithms to be described hereinafter.

As indicated above, the control 20 includes a vision data processor 24. The vision data processor 24 includes a microprocessor 41 and a memory 42 both tied directly to the system bus 43.

Cycle control 23 includes a microprocessor 44 and an interrupt control 45, both tied directly to the system bus 43. Operating system programs executed by microprocessor 44 are stored in memory 46 and include programs identified as mode control 47, auto mode 48, and teach mode 49. Data defining the user specified locations, velocities and functions are stored in data store 50. Memory 46 is connected directly to system bus 43. The set of programs identified as auto mode 48 is used by microprocessor 44 to execute the cycle of operation defined by the data stored in data store 50. Execution of the auto mode programs is carried out by microprocessor 44 independently until execution is interrupted by an interrupt signal processed by interrupt control 45.

Servo control 21 (FIG. 1) is shown at 51 in FIG. 2 and includes a servo supervisor which processes servo command signals produced by cycle control 23 and the servo input/output modules to be described, and associated with the actual control of the manipulator axis drive motors. The servo supervisor comprises a microprocessor 52, a programmable timer 53 and a local memory 54 which contains the servo control process programs 55. Servo interrupt signals are periodically produced by the programmable timer 53. The period between interrupt signals defines the interval of each iteration of path control procedures executed by cycle control 23. The elements comprising the servo supervisor receive manipulator axes command signals representing increments of motion of the manipulator relative to its axes of rotation to be effected during the iteration interval. These manipulator axis command signals are processed by the servo supervisor to produce servo command signals defining sub-increments for each of the manipulator axes effective for sub-divisions of the iteration interval. The servo command signals are distributed to the servo input/output modules at predefined sub-intervals of the iteration interval. The servo input/output modules use the servo command signals and feedback signals produced by position transducers to control the manipulator axes drive motors. It will be noted that elements 52, 53 and 54 are connected to a local bus 56 which, in turn, is connected to the system bus 43 through dual port memory 57.

Servo input/output is accomplished by microprocessor 52, and memory 54, through drive interface circuitry 58, and manipulator axis position measuring transducer interface 59. These elements are interconnected by local bus 56. Microprocessor 52 controls manipulator axis drive motors 60 and 61 through amplifiers 60a and 60b in response to the servo command signals and the feedback signals according to servo input/output programs 62 stored in memory 54. Each manipulator axis servo command signal is compared to the corresponding current position signal as defined by position transducer 63 or 64 to produce a position error signal which is then applied to the drive interface circuitry 58 to produce a drive control signal for application to the associated manipulator axis drive motor.

It will be noted that the block diagram of FIG. 2 illustrates servo input/output interfaces represented by blocks 65 and 67. It will be understood that each of blocks 65 and 67 represent both a driver interface circuitry similar to drive interface circuitry 58 and a machine axis position measuring transducer interface similar to that shown at 59. It will further be understood that each of blocks 66 and 68 represents two drive motors and an amplifier and a resolver associated with each. Servo command signals represent increments of manipulator axis motion to be effected within a few milliseconds. By contrast, the manipulator axis command signals represent increments of manipulator member motion to be effected within the iteration interval of 10 to 20 milliseconds.

In addition to the generation of the manipulator axis command signals, cycle control 23 controls the execution of functions represented by input signals and associated with the tool 14 (FIG. 1) to be performed at programmed locations. Function commands are stored with the Program data in data store 50 and are executed in accordance with function execution subroutines associated with the auto mode programs 48. Control of manipulator functions is effected through input/output devices, such as limit switches, push buttons, relays and solenoids. The manipulator input/output devices are directly controlled by the data input/output-device input/output board 69 in cooperation with the machine input/output interface circuitry 70. Data is transferred to and from the system bus 43 through dual port device 71. The dual port device 71 is connected to the local bus 72 of board 69. Operation of board 69 is controlled by the local microprocessor 73 connected to bus 72 which executes programs stored in local memory 74.

Connection of the manipulator input/output interface circuitry 70 to board 69 is accomplished through a serial interface circuit 75. A control cabinet operator panel 76 is connected by parallel lines to a parallel interface circuit 77. Monitoring and control of the interface circuits 75 and 77 are accomplished by the microprocessor 73 in response to respectively the manipulator input/output program 78 and the operator panel input/output program 79 stored in local memory 74. Current conditions of the manipulator input/output devices are reflected in device status signals transferred from the panel 69 through the dual port device 71 to the cycle control 23. Function command signals produced by cycle control 23 in accordance with the stored program of operation are transferred over system bus 43 through dual port 71 and ultimately to the appropriate manipulator input/output interface device by the serial interface 75.

In addition to signal exchange between manipulator device interfaces, the control permits exchange of data through the board 69 and its associated interfaces. While the cycle control 23 is operating under the auto mode programs 48, location data may be exchanged in response to function commands. This in-process data exchange takes place between the vision system signal processing computer 26 (see also FIG. 1) and the control 20 through board 69. Location data from the data store 50 is transferred from system bus 43 to board 69 through its dual port device 71. The microprocessor 73 operating under control of the vision system data input/output program 81 stored in its local memory 74 transfers the initialization data from dual port device 71 to the serial channel interface 82 for transmission to vision system signal processing computer 26. In reverse, data from the vision system signal processing computer 26 is input to the serial channel interface 82 and transferred therefrom on local bus 72 to the dual port device 71. From there data is available to the vision data processor 24 on system bus 43.

In addition to the in-process data exchange just described, program data may be exchanged between data store 50 of memory 46 and a bulk data store through a bulk data transceiver 83. Examples of a bulk data store include serial tape and data disk devices. Data is exchanged by microprocessor 73 operating in response to the bulk data transceiver input/output program 84 stored in memory 74. Data is transferred to and from the bulk data transceiver 83 through the serial channel interface 82 to the local bus 72 and through the dual port device 71 connected to system bus 43.

A final data input/output device, the teach pendant 85, is associated with the execution of teach mode programs 49 by the cycle control 23. Location and function data defining a programmed cycle of operation maY be generated by an operator using the teach pendant 85. This pendant permits manual operation of manipulator 1 and the storage of location and function data in data store 50. As with other data input/output devices, data is transferred to and from pendant 85 through the serial channel interface 82 to local bus 72 and therefrom through the dual port device 71 to the system bus 43. As the teach mode of operation does not form a part of the present invention, further details thereof shall not be given herein. Additional details of the operation of the manipulator in the teach mode may be found in U.S. Pat. No. 3,920,972.

Since it is an object of the auto mode programs 48 to control the motion of the manipulator members to produce motion of the tool center point 19 along a straight line path between programmed locations, a schematic representation of the manipulator can be useful in describing the auto mode control algorithms. Such a schematic representation is depicted in FIG. 3.

Figure 3:
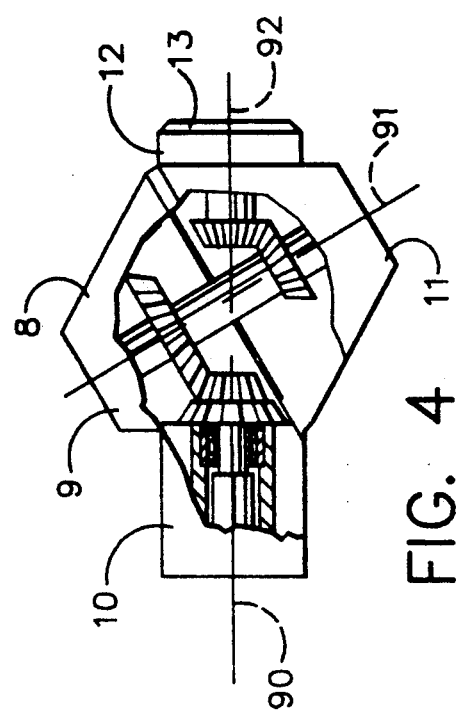
FIG. 3 is a schematic representation of the manipulator shown in the manipulator coordinates.

In FIG. 3 a first line segment 87 is shown corresponding to the manipulator upper arm 4 of FIG. 1. A second line segment 88 is shown corresponding to the manipulator forearm 6 of FIG. 1. The shoulder axis 17, elbow axis 18, wrist 8 and the tool center point 19 of FIG. 1 are also indicated in FIG. 3. The wrist 8 and tool center point 19 are shown joined by line segment 89.

The line segments 87, 88, and 89 of FIG. 3 are dimensioned respectively with lengths M1, M2, and M3. Length M1 represents the length of the upper arm 4 between shoulder axis 17 and elbow axis 18. The length M2 represents the length of forearm 6 from the elbow axis 18 to the center of wrist 8. Finally, length M3 represents the distance between the center of wrist 8 and the center point 19 of tool 14.

In FIG. 3, the line segments 87, 88, and 89 are shown in relation to the rectangular coordinate system X, Y, Z frequently referred to as the manipulator "world" coordinate system. The origin of this coordinate system corresponds to a point on the manipulator 1 located at the intersection of vertical base axis 16 and horizontal shoulder axis 17. It will be noted from FIG. 3 that the vertical Z axis of the world coordinate system is coaxial with base axis 16. When the manipulator 1 is in its "home" position, the horizontal Y axis is coaxial with shoulder axis 17 and the horizontal X axis is perpendicular to and passes through the intersection of base axis 16 and shoulder axis 17.

A second coordinate system is used in association with the manipulator. This coordinate system, L, B, and A, has its origin at the center point of wrist 8. The center point of wrist 8 is defined as the intersection of its three axes of rotation. This second coordinate system is frequently referred to as the "hand" coordinate system. The line segment 89 of FIG. 3, representing the distance M3 between the center point of wrist 8 and the center point 19 of tool 14 comprises a vector in the hand coordinate system with components L, B and A.

At any given instant . in time the three orientation angles define the orientation of the hand axis system L, B, A to the manipulator axis system X, Y, Z. As a consequence, and as is known in the art, transformations from the manipulator coordinate system to the hand coordinate system and from the hand coordinate system to the manipulator coordinate system can be performed and stated as follows:

$$\underbrace{\begin{bmatrix} X \\ Y \\ Z \end{bmatrix}}_{\text{manipulator}} = \begin{bmatrix} X_w \\ Y_w \\ Z_w \end{bmatrix} + [Q] \underbrace{\begin{bmatrix} L \\ B \\ A \end{bmatrix}}_{\text{hand}}$$

$$\underbrace{\begin{bmatrix} L \\ B \\ A \end{bmatrix}}_{\text{hand}} = [Q]^{-1} \left\{ \underbrace{\begin{bmatrix} X \\ Y \\ Z \end{bmatrix}}_{\text{manipulator}} - \begin{bmatrix} X_w \\ Y_w \\ Z_w \end{bmatrix} \right\}$$

Where [Q] represents an appropriate transformation matrix and $$X_w$$
$$Y_w$$
$$Z_w$$

is a vector from the origin of the manipulator system to the origin of the hand coordinate system.

Returning to FIG. 3, rotation of the manipulator about its base axis 16 is dimensioned by the magnitude of angle a. Rotation of the manipulator upper arm is dimensioned by the magnitude of angle b. Rotation of the manipulator forearm is dimensioned by the magnitude of angle c. It will be noted that angle c is measured from the center line of the manipulator upper arm. It will be appreciated by those skilled in the art with reference to FIG. 3 that the lengths M1 and M2 and the magnitudes of angles a, b, and c completely define the location of the center point of wrist 8. If line segment 89 were coaxial with line segment 88, then lengths M1, M2, and M3 together with the magnitudes of angles a, b, and c would completely define the location of the tool center point 19.

Figure 4:
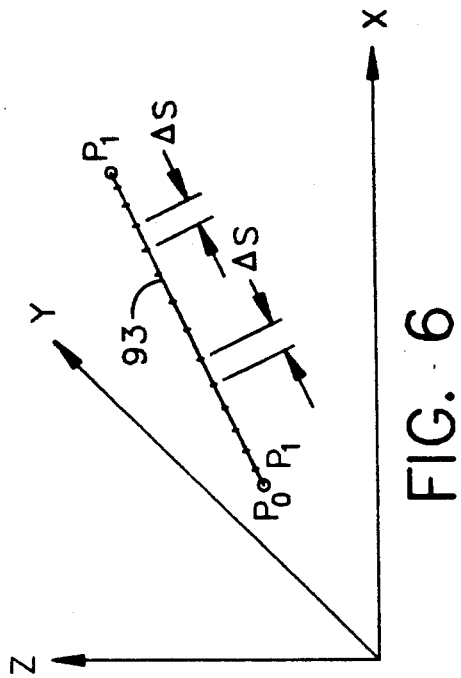
FIG. 4 is an elevational view, partly in cross section, illustrating the manipulator wrist and its axes of rotation.

The introduction of rotation at the axes of wrist 8 provides for orientation of a function element associated with tool 14 through the tool center point 19. The wrist 8 is shown enlarged in FIG. 4. As indicated above, the wrist comprises first segment 9 with its integral shaft 10 by which the wrist 8 is attached to the manipulator forearm 6. The wrist further comprises second segment 11 and its integral shaft 12, which supports face plate 13. The first axis of rotation 90 of wrist 8 is defined by rotation of wrist segment 9. The second axis of rotation of wrist 8 is defined by rotation of wrist segment 11. This axis is indicated at 91 and is perpendicular to the abutting faces of wrist segments 9 and 11. The third axis of rotation of wrist 8 is defined by rotation of face plate 13. This axis is indicated at 92 and is perpendicular to face plate 13. Rotation about wrist axis 90 is designated $\rho1$. Rotation about wrist axis 91 is designated $\rho2$. Finally, rotation of face plate 13 is designated by $\rho3$.

Figure 5:
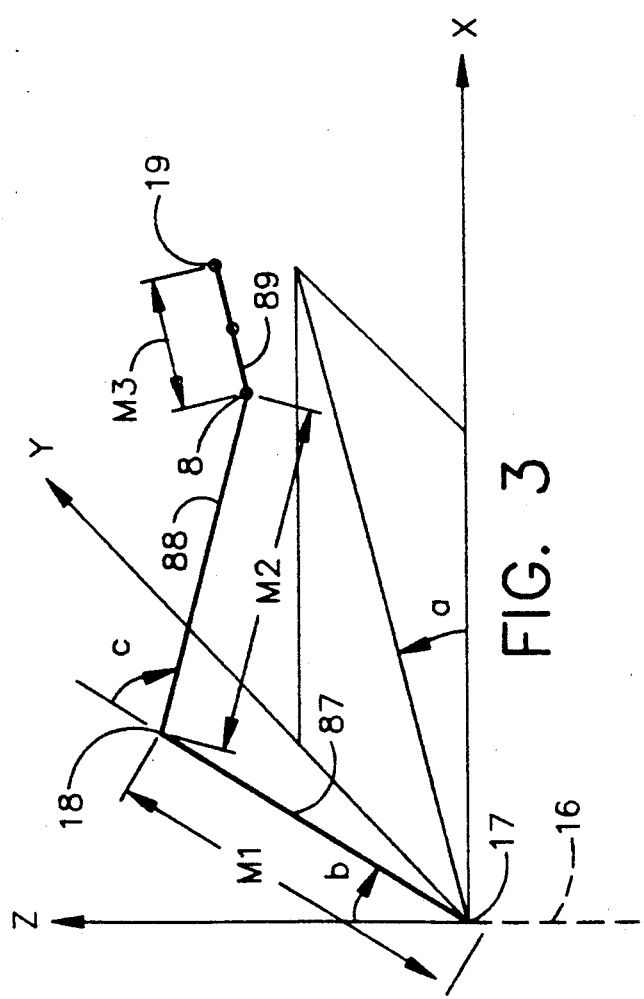
FIG. 5 is a schematic representation of the hand coordinate system and the orientation angles D, E, R.

FIG. 5 illustrates how the orientation angles are defined with respect to the hand coordinate system, having its origin at the center of wrist 8. The orientation angles D, E, and R define rotations relative to the hand coordinate system as follows:

(1) E is the magnitude of a rotation about A to align L and B with $L_1$ and $B_1$, respectively;

(2) D is the magnitude of a rotation about $B_1$ to align $L_1$ with $L_2$ and A with $A_2$; and (3) R is the magnitude of a rotation about $L_2$ to align $B_1$ with $B_3$ and $A_2$ with $A_3$.

It will now be appreciated by one skilled in the art that, when the lengths M1, M2, and M3 are known, the position of tool center point 19 can be completely defined in terms of the three translation values X, Y, and Z and the three orientation angles D, E, and R.

In the control system of the present invention, when a path is being computed in the auto mode, or the manipulator 1 is being taught in the teach mode, the manipulator (world) coordinate system, X, Y, Z, D, E, R is used. Signals to the servo system of the present invention must be in terms of joint angle positions (i.e., motor positions), frequently termed "joint space". As a result, these signals are in terms of a, b, c, $\rho1$, $\rho2$, $\rho3$. As is known in the art, there are matrix transformation operations for transformations between X, Y, Z, D, E, R and a, b, c, $\rho1$, $\rho2$, $\rho3$.

Figure 6:
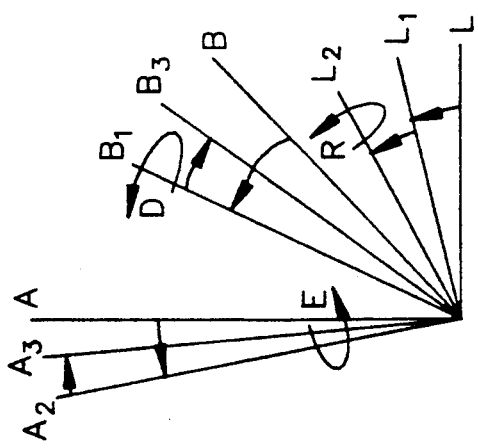
FIG. 6 is a schematic representation depicting the motion effected by the controlled manipulator in an automatic mode of operation.

Reference is now made to the geometric schematic representation of FIG. 6. In this figure, the straight line segment 93 represents the path of motion along which the tool center point 19 is to proceed in traveling from point $P_0$ to $P_1$ defined by stored input signals. The manipulator control in auto mode straight line path, effecting the path motion in incremental intervals $\Delta t$. The coordinates of points $P_0$, $P_1$, and the intermediate points $P_i$ are all defined with respect to the manipulator (world) coordinate system. Assuming that the tool center point 19 is to start from rest at point $P_0$ and to come to rest again at $P_1$, then the path control scheme provides automatic acceleration and deceleration to and from a programmed velocity. While the increments defined by the intermediate points $P_i$ are produced in accordance with a fixed increment interval period, the actual incremental distance between points $P_i$ varies as the velocity of the tool center point varies. Thus, the incremental distance $\Delta S$ referred to as a "minispan", which corresponds to the distance traversed during a constant incremental interval $\Delta t$ is seen to vary between the constant velocity portion of the motion and the acceleration and deceleration phases of the prescribed motion.

In the practice of the present invention, $\Delta t$ is equal to 15 milliseconds. Thus, the servo input/output board 51 receives position commands from cycle control board 23 every 15 milliseconds, and the cycle control board 23 is calculating fast enough to provide these signals. The cycle control 23 computes how far the tool center point can move along line $P_0$, $P_1$ during each interval $\Delta t$ based on acceleration, deceleration, programmed velocity, and the like, and provides the servo input/output board 51 with appropriate joint space signals to accomplish this.

Figures 7, 8:
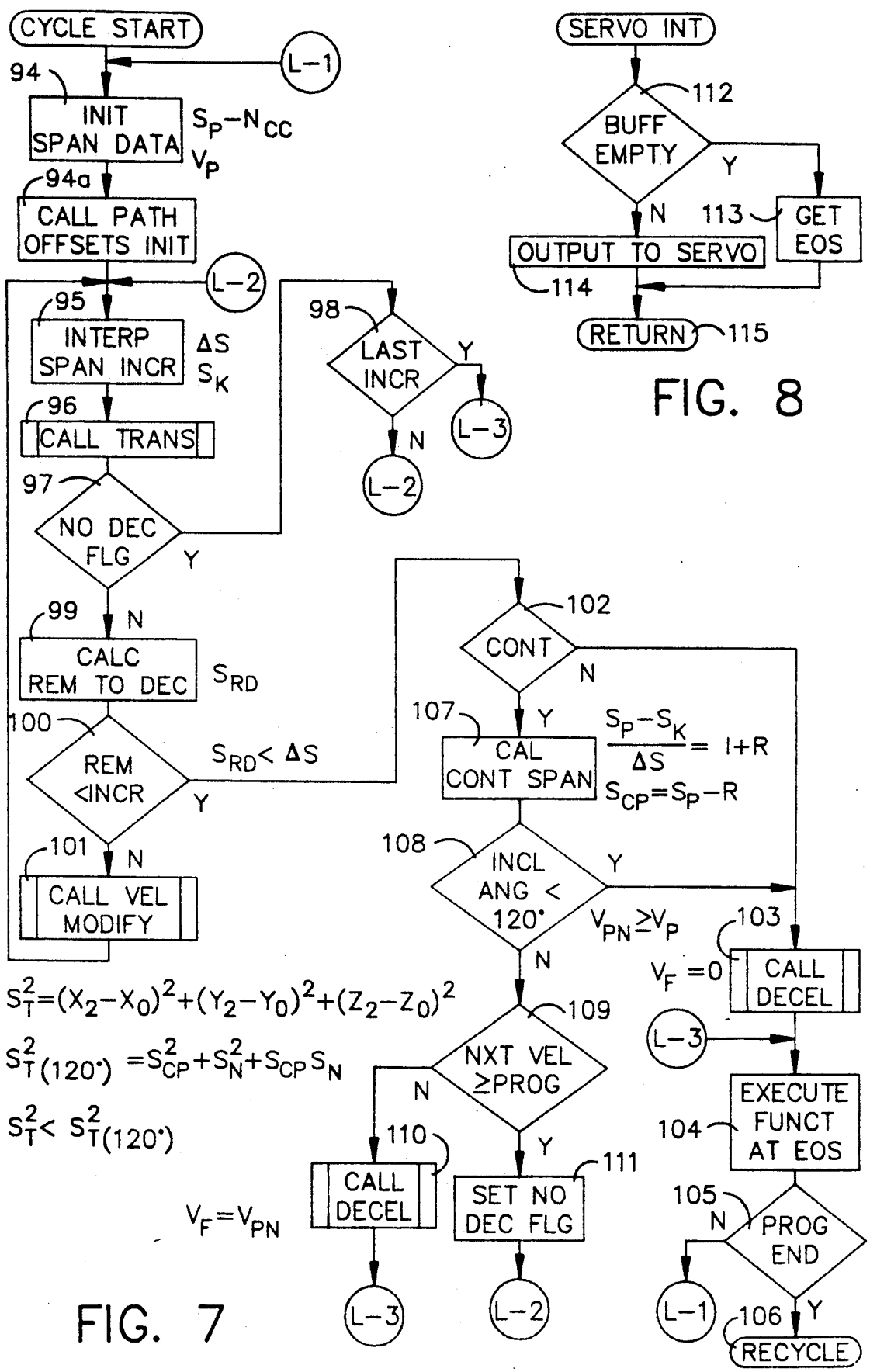
FIGS. 7 and 8 are flow charts of the two principal control procedures effecting motion control.
Figure 9:
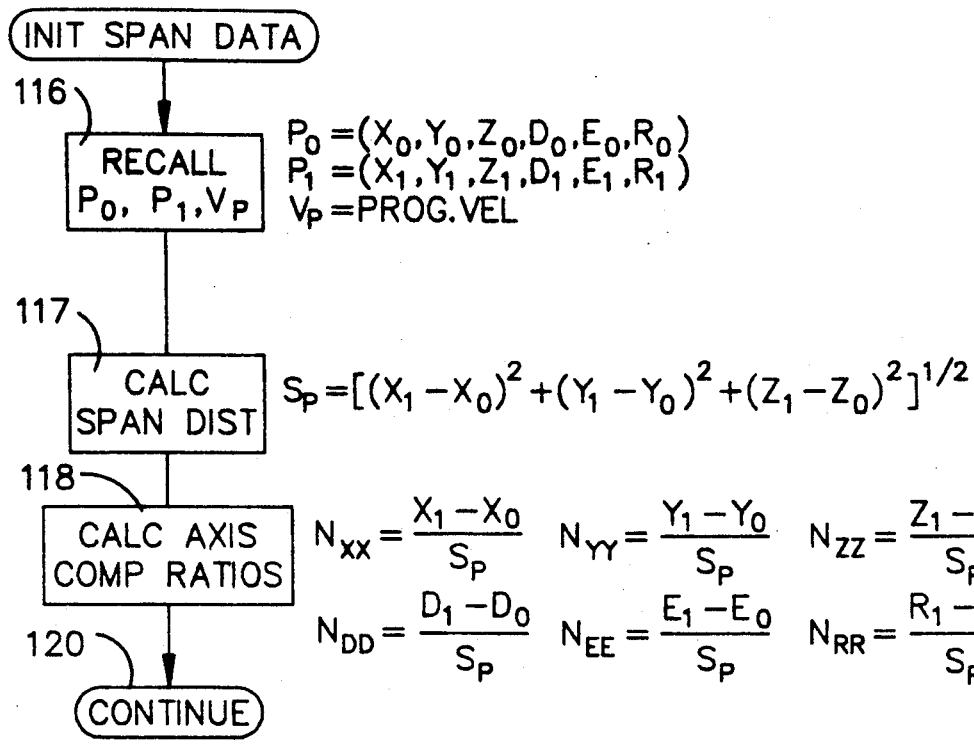
FIGS. 9–12 are flow charts of subroutines and major segments of the flow chart of FIG. 7.

The overall cycle of operation of the manipulator 1 in the automatic mode is illustrated by the flow chart of FIG. 7. At process step 94, the control initializes the span data required to interpolate the motions between the programmed points $P_0$ and $P_1$ at the programmed velocity $V_p$. Values for a programmed span length $S_p$, and coordinate component ratios $N_{cc}$ are produced by the procedure associated with step 94. At process step 94a the path offsets initializing subroutine is called. At process step 95, an increment along the path is interpolated to produce the incremental distance $\Delta S$ and the accumulated incremental distance $S_k$. Process step 96 calls the subroutine to effect a transformation of the interpolated intermediate point from world coordinates to joint angle positions. The subroutine associated with process step 96 produces the axis command signals and stores these signals in a buffer for access by the servo supervisor on the occurrence of the servo interrupt signal. Following the execution of the subroutine of process step 96, a test is made at decision step 97 to determine whether or not a flag indicating that no deceleration is required has been set. If the no deceleration flag has been set the process continues at decision step 98 where it is determined whether or not the present increment being interpolated is the last increment of the current linear span between programmed locations. If not, another increment is interpolated through the connector L-2. If the current increment is the last increment of the span, the process continues through connector L-3 to process step 104 where the function associated with the end of span is executed. Thereafter, decision step 105 determines whether or not the present location is the last location of the program. If not, further programmed location data will be processed by proceeding through connector L-1. If it is the last, the entire programmed cycle of operation will be reexecuted as indicated by terminal 106.

Returning to decision step 97, had it been determined that the no deceleration flag was not set, then the execution of the procedure continues at process step 99. This step calculates the distance remaining $S_{RD}$ in the current span prior to the point at which a deceleration to stop must begin. At decision step 100, the magnitude of the remaining distance $S_{RD}$ is tested against the current incremental distance $\Delta S$ to determine whether or not the remaining distance $S_{RD}$ is less than the current incremental distance $\Delta S$. If the remaining distance is not less than the current incremental distance, the process continues at step 101 where execution of a velocity modification subroutine is initiated by a subroutine call. A velocity modification subroutine may respond to any process parameter to produce a change in the incremental velocity to adapt the tool center point velocity to process changes or to constrain manipulator axis velocities to their associated limits. Upon completion of this subroutine, the procedure continues through the loop at process step 95 where the span increment is interpolated using the most recently created value of incremental velocity.

Returning to decision step 100, had it been determined that the distance remaining $S_{RD}$ was less than the incremental distance $\Delta S$, then execution of the procedure would continue at decision step 102. This step determines whether or not motion is to continue through the programmed location defining the end of the current linear span. If the tool center point is to come to rest at the end of the current span, then decision step 102 will determine that the programmed location is not a continue point, and the execution of the procedure will continue at process step 103 where execution of the deceleration subroutine is initiated by the call setting the final velocity parameter signal $V_f$ equal to zero. Upon completion of the execution of the deceleration subroutine, execution of the overall procedure continues at process step 104 where the function command associated with the end of the current span will be executed. Thereafter, at decision step 105, it is determined whether the present programmed location is the last programmed location of the program. If it is, program execution is resumed by beginning at the first location of the stored program through the terminal 106 indicating that the program should be recycled. If the present location is not the last location of the stored program, execution proceeds through the connector L-1 to interpolate the next programmed linear span.

Referring again to decision step 102, if it had been determined that the programmed location for the end of the current span is one through which motion of the tool center point is to continue, execution of the overall cycle control procedure advances to process step 107 where a new end position for the current span is computed. Because the interpolated intermediate positions are spaced apart by an incremental distance defined by the incremental interval period and the effective increment velocity, it is anticipated that when motion is to continue through a programmed position the distance remaining in the span from the deceleration decision position to the programmed end position will not always equal an integral multiple of the current incremental distance. To account for this discrepancy, the current span is effectively terminated at the integral multiple of the current incremental distance nearest the programmed end position. To accomplish this, the distance remaining $S_p - S_k$ is divided by the incremental distance $\Delta S$ to produce the integer multiple and remainder. The current span length is then reduced by the remainder to produce the continue span length $S_{CP}$. This distance then redefines the end position of the current span and the start position of the next span.

At decision step 108, it is determined whether the angle included between the current span and the next span is less than 120°. If the included angle is less than 120° the motion of the tool center point will be terminated at the final location $P_1$ of the current span. The determination of the value of the included angle relies upon the rule of cosines. Two values for the span distance between the programmed location at the beginning of the present span and the programmed location at the completion of the next span are produced independently. That is, the span length $2^2{}_T$ is computed as the sum of the squares of the rectangular coordinate components while the value $S^2{}_T (120°)$ is computed as the sum of the square of the span length $S_{CP}$ computed in process step 107, the square of the span length $S_n$ of the next span, and the product of the next span length $S_n$ and the span length of the present span $S_{CP}$. If $S^2{}_T$ is less than $S^2{}_T(120°)$, then the included angle is less than 120°.

If the included angle is less than 120°, then it is necessary to bring the motion to a halt before proceeding and the process would again continue through the call to the deceleration procedure at process step 103. If the included angle is 120° or greater, then the process continues at decision step 109. Decision step 109 determines whether or not the programmed velocity of the next span is greater than or equal to the current programmed velocity. If the programmed velocity of the next span is less than the programmed velocity of the current span, then it is necessary to effect a deceleration in the current span so that the motion in the next span will be started at the velocity programmed for that span. Following the deceleration procedure called by process step 110, the overall cycle is continued at process step 104 through connector L-3. If the programmed velocity for the next span is in fact greater than or equal to the programmed velocity of the current span, then the process from decision step 109 continues at the process step 111 which sets the no deceleration flag. Thereafter, the overall cycle of operation previously described is resumed through the connector L-2.

It will now be apparent that the overall cycle control comprises the repeated execution of the stored program. Motion between programmed locations involves the iterative production of incremental moves along the straight line path therebetween. The overall cycle comprises manipulator motion and the execution of programmed functions associated with the programmed locations.

Referring to FIG. 8, the servo interrupt service routine executed by the servo control begins at decision step 112, where it is determined whether or not the buffer in which axis command signals are temporarily stored is empty. If the buffer is empty it is assumed that the cycle control has reached the end of span and an end of span signal is set at process step 113. If the buffer is found not to be empty by decision step 112, then the axis motion increments represented by the axis command signals are retrieved from the buffer at step 114. At terminal 115 the servo interrupt routine is ended and execution of the overall cycle of operation by the cycle control 23 resumes. As was previously stated, the servo supervisor divides the increments, represented by the axis command signals, into subincrements which are used to command servo position during predetermined subintervals of the iteration interval. The process of division and output of the servo command signals continues concurrently with the execution of the overall automatic mode procedure by the cycle control 23.

The description of the major segments and subroutines associated with the flow chart of FIG. 7 will be described with respect to FIGS. 9–12. The flow chart of FIG. 9 corresponds to the process step 94 of FIG. 7. At process step 116, programmed span data corresponding to preprogrammed input signals is recalled from data store 50 of memory 46. The start point $P_0$, end point $P_1$ and programmed velocity $V_p$ define the motion to be next executed by tool center point 19. The programmed coordinate data recalled from memory are shown subscripted in correspondence with the programmed point designation. At process step 117, the total span length is computed using the rectangular coordinates of the two programmed points and extracting the square root of the sum of the squares of the coordinate components. At process step 118, the in-axis component ratios of the programmed coordinate system are computed by dividing the coordinate components by the span length. These ratios are designated $N_{XX}$, $N_{YY}$, $N_{ZZ}$, $N_{DD}$, $N_{EE}$, and $N_{RR}$. Axis component ratios for the orientation angles are computed in the same way as the component ratios for the rectangular coordinate axes. Once this preliminary computation of span variables is completed, the overall cycle of operation continues through the terminal 120 to the process block 94a of FIG. 7.

Figure 10:
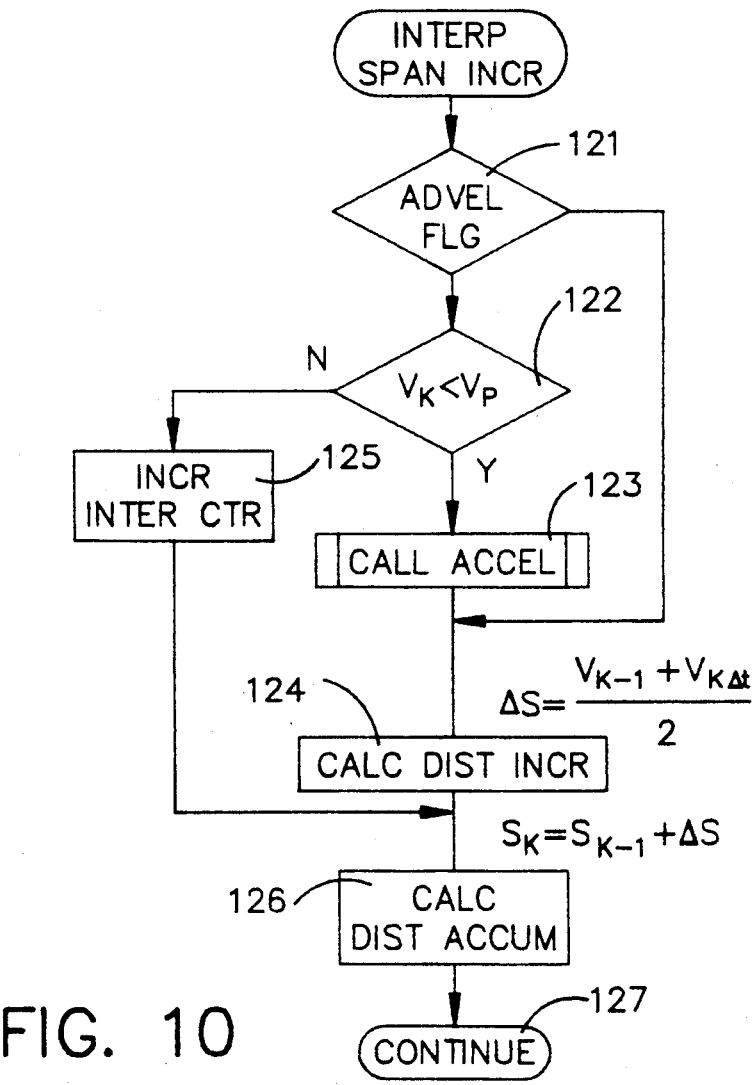

Referring now to FIG. 10, the process step of interpolation of a span increment corresponding to block 95 of FIG. 7 is expanded into a more detailed flow chart. Beginning at decision step 121, the determination is made whether or not an adaptive or nonprogrammed velocity flag has been set by the subroutine called by process step 101 of FIG. 7. If there is no adaptive velocity function programmed for the current span, or if the adaptive velocity function has not resulted in a change to the incremental velocity value, then the adaptive velocity flag will not be set and the process will continue at decision step 122. Decision step 122 tests the value of the current incremental velocity signal $V_K$, that is, the incremental velocity of the current iteration K, against the value of the programmed velocity signal $V_P$ to determine whether or not the current incremental velocity is less than the programmed velocity If so, the process continues at process step 123 which calls the acceleration subroutine.

The effect of the acceleration subroutine is to produce a new value for the incremental velocity in accordance with a predetermined function of acceleration and produce a corresponding distance increment $\Delta S$. Thus, at the beginning of a move where the tool center point starts from rest, the initial value of the incremental velocity shall be zero, the programmed velocity will, of course, be a non-zero value, and the call to the acceleration subroutine at process step 123 begins the change of the incremental velocity values and produces an incremental distance signal $\Delta S$. When the incremental velocity $V_K$ is not less than the programmed velocity $V_P$, it is not necessary to calculate a new value for the incremental distance signal, and it is only necessary to increment the iteration counter as indicated by process step 125. In either event, the process ultimately resumes at process step 126 where the value of the accumulated increment signal $S_K$ is calculated in accordance with the equation set forth to the right of process step 126. The overall cycle of operation is then continued by the continue of flow chart terminal 127. At this point, the overall cycle of operation continues by the call of process step 96 of FIG. 7, calling the transformation subroutine illustrated in the flow chart of FIG. 11.

Figures 11, 12:
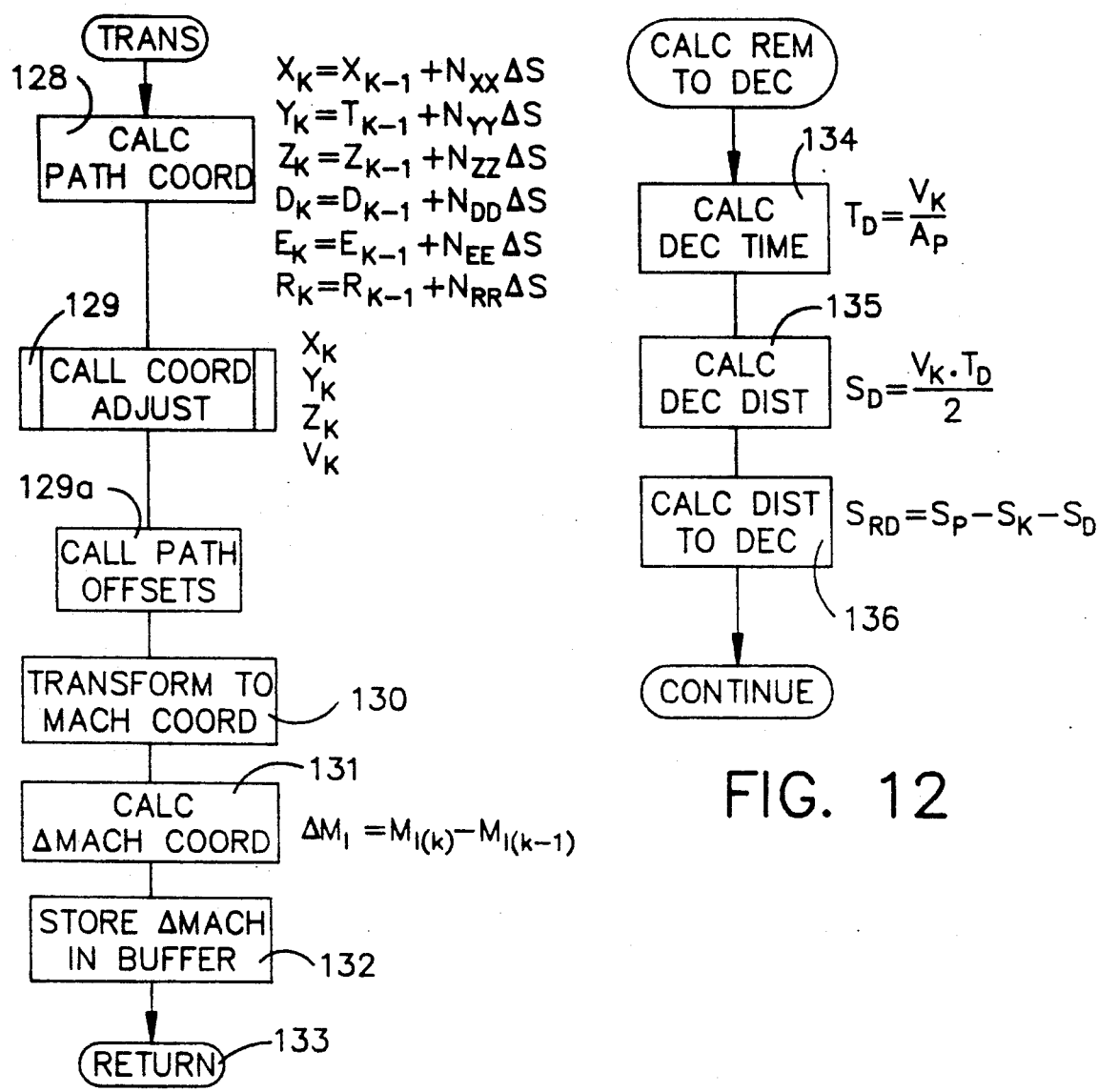

Referring to FIG. 11, at process step 128, the values of the end point coordinate signals representing coordinates in the manipulator coordinate system of the accumulated interpolation distance are calculated. This is accomplished by summing the in-axis components of the interpolated incremental distance represented by the increment distance signal $\Delta S$ with the previous values of the end point coordinate signals subscripted K-1. At this point step 129 calls a coordinate adjust routine. The interpolated point coordinates on the programmed path are adjusted in response to inputs produced by, for example, a seam tracking device such as the vision system. There may be occasions when the adjustments called for by the vision data processor 24 in conjunction with the vision tracking system are greater than a limit defined by the manipulator operator. The adjustments applied at step 129 will advantageously account for such limits, as is fully explained in the above noted copending application. This step also limits the magnitude of the deviation off the programmed path in accordance with a user specified parameter. At step 129a the path offsets subroutine is called as will be described hereinafter with respect to FIG. 17. Thereafter, the coordinates with reference to the program coordinate system of the interpolated point are transformed to joint angle positions a, b, c, $p1$, $p2$, $p3$ by step 130. To avoid inverse trigonometric functions, an iterative approximation algorithm is used that produces an error function based on the current joint angle positions. Details of this approach are shown in U.S. Pat. No. 3,909,600, which to the extent necessary for describing this transformation algorithm is hereby incorporated herein by reference. At process step 131, the change in the joint angle positions is calculated and at the process step 132, the incremental difference of the joint angle positions are stored in the buffer for access by the servo interrupt service routine. When the transformation routine is completed, the processing of the overall cycle of operation is resumed by the return through the terminal 133. This, then, brings the process to decision step 97 of FIG. 7. Following step 97, the overall cycle continues at process step 99 where the remaining distance to the beginning of the deceleration span is calculated and the detailed flow chart of this process step is shown in FIG. 12.

Referring to FIG. 12, process step 134 calculates the period required to decelerate using a predetermined value of acceleration. Thus, the approximate time required to decelerate to stop is equal to the quotient of the current incremental velocity $V_K$ and this constant of acceleration. At process step 135, a value of a deceleration distance signal representing the distance required to decelerate is calculated assuming that an average velocity equal to half the current incremental velocity would be in effect during the interval calculated in process step 134. Finally, at process step 136, a value of a span remainder signal $S_{RD}$ is calculated representing the remaining distance within the programmed span length from the current interpolated position to the point at which the just calculated deceleration distance must begin. Thus, the distance remaining $S_{RD}$ is equal to the programmed span length $S_P$ less the portion of the span represented by the accumulated interpolated distance $S_K$ and the portion of the span necessary to decelerate $S_D$. Following this calculation, the overall cycle of operation continues at decision step 100 of FIG. 7 wherein it is determined whether or not the remaining distance $S_{RD}$ is less than the current effective incremental distance $\Delta S$. If the remaining distance $S_{RD}$ is not less than the current effective incremental distance $\Delta S$, then another increment of that distance can be interpolated. If, however, the current effective incremental distance $\Delta S$ is greater than the calculated remaining distance $S_{RD}$, it is necessary to immediately begin deceleration.

In the exemplary, but non-limiting, seam-tracking device selected for purposes of this description, the laser scanner/camera head 15 contains a laser focused onto a servo controlled mirror, generating a side-to-side scanning motion of the laser beam. The camera portion of the laser scanner/camera head 15 views the location where the laser beam strikes the workpiece. The laser scanner/camera head 15 is provided with appropriate coolant means, shielding gas for protection of the disposable optical windows, and the like, all as is known in the art.

The camera control unit 25 turns the laser on and off, controls the scanning of the laser beam, and transmits the appropriate camera data to the signal processing computer 26. The signal processing computer 26 compares each contour profile of the workpiece obtained by the scanning laser to a specification of the profile (a template) selected by the manipulator operator from vision data processor memory 42 (see FIG. 2). If the selected profile is found, the location of points of interest (the center of the seam) on the profile are computed by the signal processing computer 26 in camera coordinates. The camera coordinates are transmitted to the vision data processor 24 (see FIG. 2) through serial channel interface 82, local bus 72, dual port 71, and system bus 43. As will be apparent hereinafter, the vision system position values are used to offset the manipulator's programmed path in order to guide the tool 14 through a desired contour. This information can also be used to adjust for part placement errors, variations in manufacturing tolerances, heat distortions of the part, irregular seam geometries and the like. While tracking, the manipulator's position is modified to keep the tool 14 in the seam. The manipulator's orientation values may be programmed as required by the weld process, without degrading tracking performance. This capability allows the welding of many parts which could not be performed if the orientation angles had to remain fixed.

It is necessary that the location and orientation of the camera head of element 15 (see FIG. 1), relative to the hand coordinate system, be determined so that a transformation can be performed to relate camera coordinates to manipulator (world) coordinates. This is fully explained in the above noted copending application and does not constitute a part of the present invention.

As indicated above, the vision system signal processing computer feeds camera coordinate data to vision data processor 24. The vision data processor 24 converts the camera coordinate data to manipulator (world) coordinate data. The laser scan/camera head 15 previews a seam ahead of the tool or weld torch 14. The seam profile is processed and its location is stored. At a later time, this seam data is used to guide tool center point 19 so that it passes directly through the tracking point. This is implemented by providing a FIFO buffer for the desired tracking points. The FIFO is written to by that routine of vision data processor 24 which accepts seam data and computes the track point in manipulator (world) coordinates. The FIFO is read by the algorithm which calls for the next point and then heads toward it. The FIFO constitutes a part of the vision data processor memory 42.

Two routines must be provided in the vision data processor for proper seam tracking operation. First, the seam processing routine accepts data from the vision system; determines the tracking point; transforms the tracking point from camera coordinates to manipulator (world) coordinates and then stores the X, Y, and Z world coordinates of the seam point in the FIFO. The seam tracking routine determines the current robot position and the current seam point FIFO entry; offsets the manipulator's path to head toward this desired point; and when this point has been reached selects a new seam point from the FIFO. Thus, the seam processing routine is responsible for the transformation of the seam data as received from the laser scanner/camera head into manipulator (world) coordinates, and placing these results in the FIFO. The seam tracking routine is responsible for removing FIFO entries at some later time, and then altering the robots path to pass through them.

The further and more detailed operations of the vision system do not constitute a part of the present invention, but they are set forth at length in the above mentioned copending application which is incorporated herein by reference.

The basic mode of operation of the manipulator 1, the vision system 15, 25 and 26, and control 20 having been described, the path offsets memorization and recall feature of the present invention will now be set forth in detail. It will be remembered that this feature enables the operator of the manipulator to memorize the offsets generated during a seam-tracking pass, controlling the sample rate at which the offsets are accumulated. Thereafter, these offsets can be recalled on successive passes (with the seam- tracking system turned off) in either the same direction as the offsets were memorized or in the reverse of that direction. This feature, together with existing taught point offset registers, provides, for example, a multipass welding feature. The path offsets memorization and recall feature provides the manipulator operator with a great degree of flexibility for both memorizing and recalling the offsets generated during a seam-tracking pass.

This feature of the present invention can be used with any function or system that causes the robot arm to deviate from the programmed path during a seam-tracked pass. Thus, during this seam-tracked pass, the offsets can be generated either manually or through the use of an appropriate sensor system of the types mentioned above.

The path offsets are both memorized and recalled at distinct distances. These distances are referred to as offset distance intervals. The offset distance interval cannot be changed while the manipulator arm moves the tool center point from one programmed point to the next in the programmed path of travel, but the offset distance interval can be changed at a programmed point. For example, the manipulator arm can move the tool center point from programmed point $P_1$ to programmed point $P_2$ while memorizing offsets with one offset distance interval and from programmed point $P_2$ to programmed point $P_3$ while recording offsets with a different offset distance interval.

The offset distance interval is selected and programmed by the manipulator operator. The smaller the offset interval distance, the more frequently offsets will be recorded. Although the robot coordinates are updated each minispan $\Delta S$ (15 milliseconds), if seam-tracking, offset corrections are computed no more frequently than the scan of the sensor system. If the sensor system is the through-the-arc system mentioned above, an offset correction is computed once per weave cycle. If, for example, the sensor system is the vision system of the above-mentioned copending application, an offset correction is computed once per scan of the laser beam. As a consequence, the smallest offset interval distance needed to record every seam-track correction in the exemplary instances given would be the distance traveled during one weave cycle, or the distance traveled during one scan of the laser beam. In many instances, multiples of these distances will prove adequate. Memory can be saved by controlling sample frequency, and, therefore, the distance between saved offsets during a lengthy weld can be expanded. The use of offset interval distances enables offsets to be recalled at the same position where they were memorized. Furthermore, it allows modifying these distances when traversing a curved surface, as will be set forth more fully hereinafter.

The use of offset distance intervals enables succeeding passes, following the initial or root seam-tracking pass, to be executed in the same direction as the root seam-tracking pass, or in the opposite direction. In the first instance, the offsets are recalled from memory on a first-in, first-out basis. In the second instance, the offsets are recalled on a first-in, last-out basis.

While seam-tracking, offsets are automatically memorized at each offset distance interval, once the path offsets memorize function has been stored with a programmed point, for example, in the teach mode by means of pendant 85. Each offset is placed sequentially in a memory data table constituting a part of data store 50 of memory 46 (see FIG. 2), as will be further described. After the robot reaches a path offsets OFF point, memorization of offsets ceases.

The path offsets are recalled by executing a path offsets recall function, assuming the seam-tracker has been turned off. Offsets are thereafter recalled at each offset distance interval position. The recalled path therefore has the same path deviations as the seam-tracked path.

Figure 13:
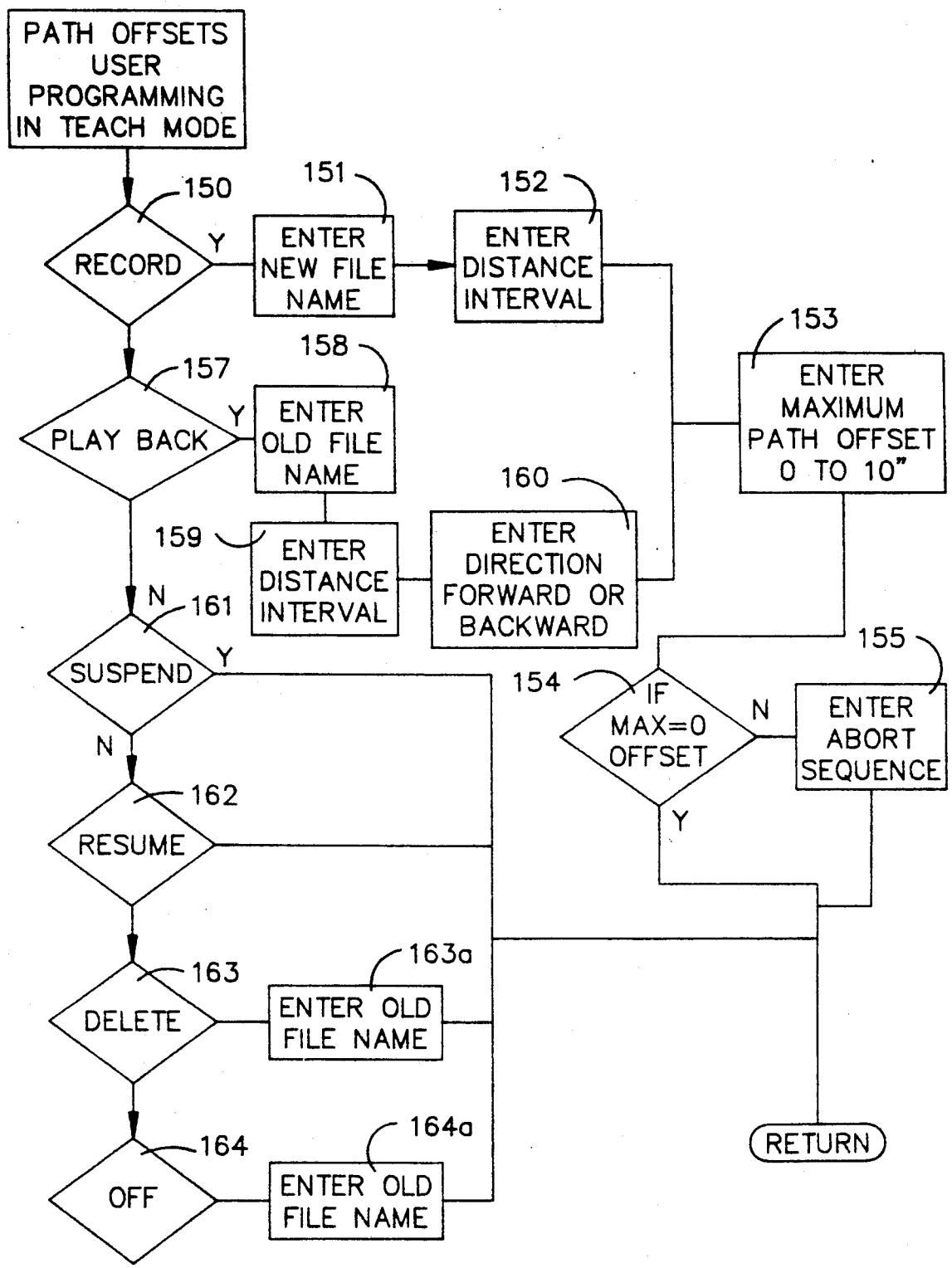
FIG. 13 is a flow chart of the path offsets user interface.
Figure 15:
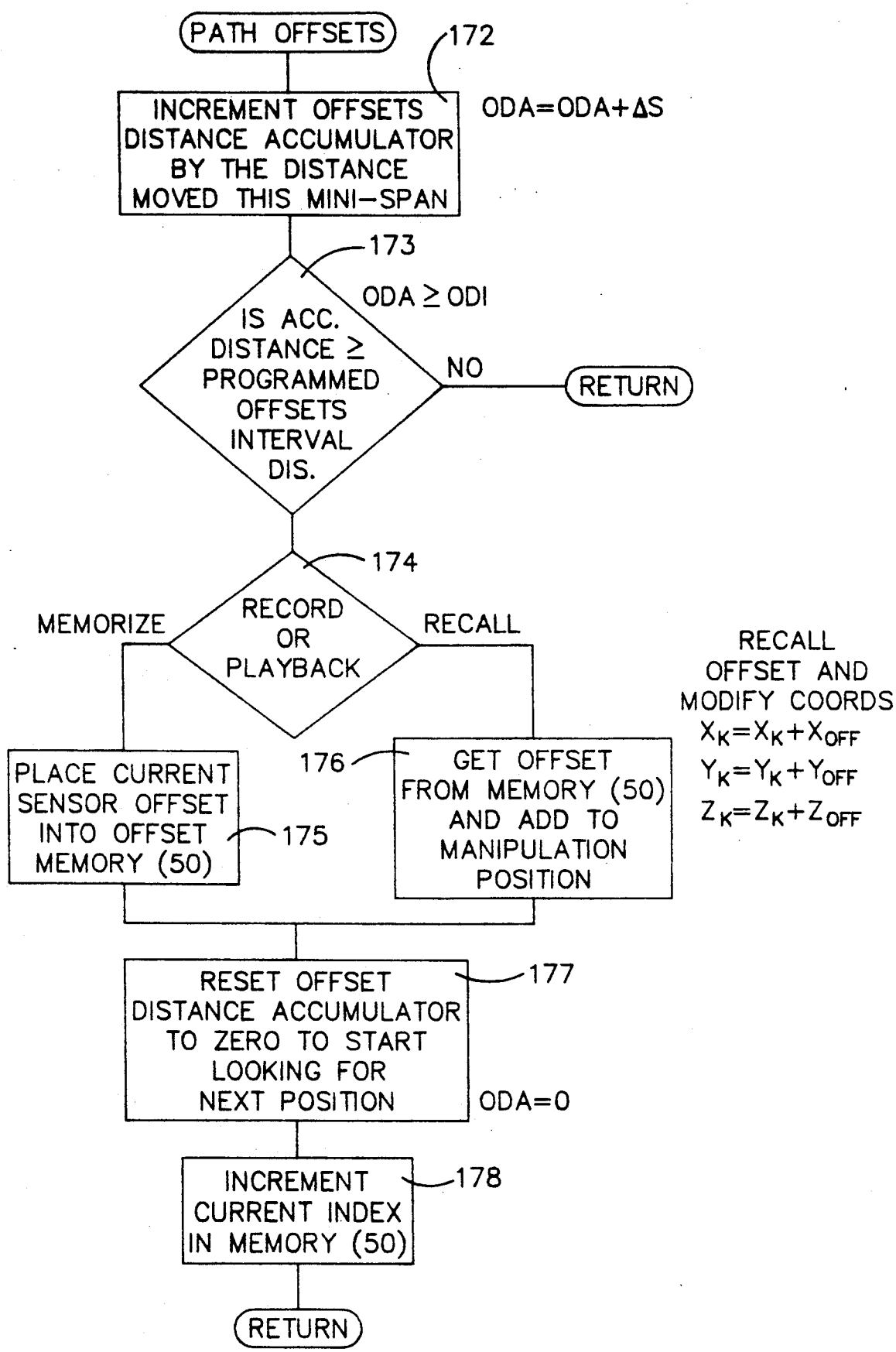
FIG. 15 is a flow chart of the path offsets memorization and recall operation subroutine of FIG. 11.

Before the seam-tracking pass is executed and the subsequent offsets recall pass or passes are executed, it is necessary for the manipulator operator to program data store 50 of control 20 using the teach mode. Reference is made to FIG. 15 which constitutes a flow chart of the path offset user interface. When the operator of the manipulator wishes the offsets of the seam-tracked pass to be memorized, as indicated in FIG. 13, he will make the proper yes choice at decision step 150. At step 151 he will enter the new file name so that the offsets data table can be identified. Thereafter, at step 152 he will select and enter the offset distance interval.

At step 153, the operator will enter the maximum path offset to be recorded. A practical range for this selection would be from 0 to 10 inches. If the operator enters as the maximum path offset 0 inches, this is equivalent to a decision at decision step 154 that there will be no maximum path offset. This being the case, this phase of the programming is finished.

If at step 153 the operator enters a maximum path offset value other than 0, then at decision step 154, the "no" path is followed, leading to step 155. At step 155, the operator programs an abort sequence, should a maximum path offset greater than the selected value occur. The programmed abort sequence will contain those steps necessary to properly close down the manipulator, including such steps as shutting off the weld wire feeder, shutting off the weld gun, shutting off the sensor system, and the like. Once the abort sequence has been entered in step 155, this ends this segment of the programming as indicated at 156.

While at this stage, the seam-tracked pass could be performed with subsequent passes programmed in the teach mode thereafter, the better practice is to program the entire sequence of the seam-tracked pass and the subsequent recall offsets pass or passes at one time. To program a subsequent pass utilizing recalled offsets, the manipulator operator selects the "yes" branch at decision step 157. At step 158, the file name entered in step 151 is again entered. At step 159, the offset distance interval entered at step 152 is again entered. At step 160, the operator enters the direction in which this subsequent pass is to be executed.

From step 160, the operator then re-executes step 153 and those steps which follow, as described above. The operator performs each of the steps following decision step 157 for each subsequent pass following the seam-tracking pass. Thus, if the weld requires three subsequent passes, the steps following decision step 157 will be performed three times, one for each of the three subsequent passes.

If, during any of the passes, motion of the robot arm is to stop (such as at an interrupt signal), this can be programmed in an interrupt service routine by the operator by selecting the "yes" branch of decision step 161 which will execute immediately upon entering the interrupt service routine. If the robot arm motion is to continue from the position of where it was stopped, this can be programmed by selecting the "yes" branch of decision step 162 which will execute immediately upon leaving the interrupt service routine.

The end of the welding sequence is programmed by selection of the "yes" branch of decision step 164 signifying an offsets OFF point. If the offsets data memory table is not to be retained, this can be programmed by selecting the "yes" branch of the delete decision step 163, which effectively turns off memorization or recall and removes offsets associated with the file name from memory.

Once the operator programming of FIG. 13 has been performed in the teach mode, the manipulator is ready for operation in auto mode 48, in the manner described with respect to FIGS. 7 through 12. Returning to FIG. 7, step 104 will have been executed at the conclusion of the previous manipulator move. The execution of this path offsets function (step 104) will determine the path offsets features at step 94 for the next move. It will be noted that step 94 is followed by step 94a. At process step 94a, a subroutine is called in preparation for a pass, whether the pass be an initial seam-tracked pass or a subsequent pass. This subroutine is illustrated in FIG. 14.

The control 20 is provided with an offset distance accumulator. The offset distance accumulator 165 accumulates the distance tracked per minispan. When this accumulated distance is equal to or slightly greater than the offsets distance interval, then an offset will be recorded. It will be remembered that a minispan represents 15 milliseconds. However, the distance traveled during each 15 millisecond minispan depends upon whether the robot arm is accelerating, moving at the programmed velocity, or decelerating.

Figure 14:
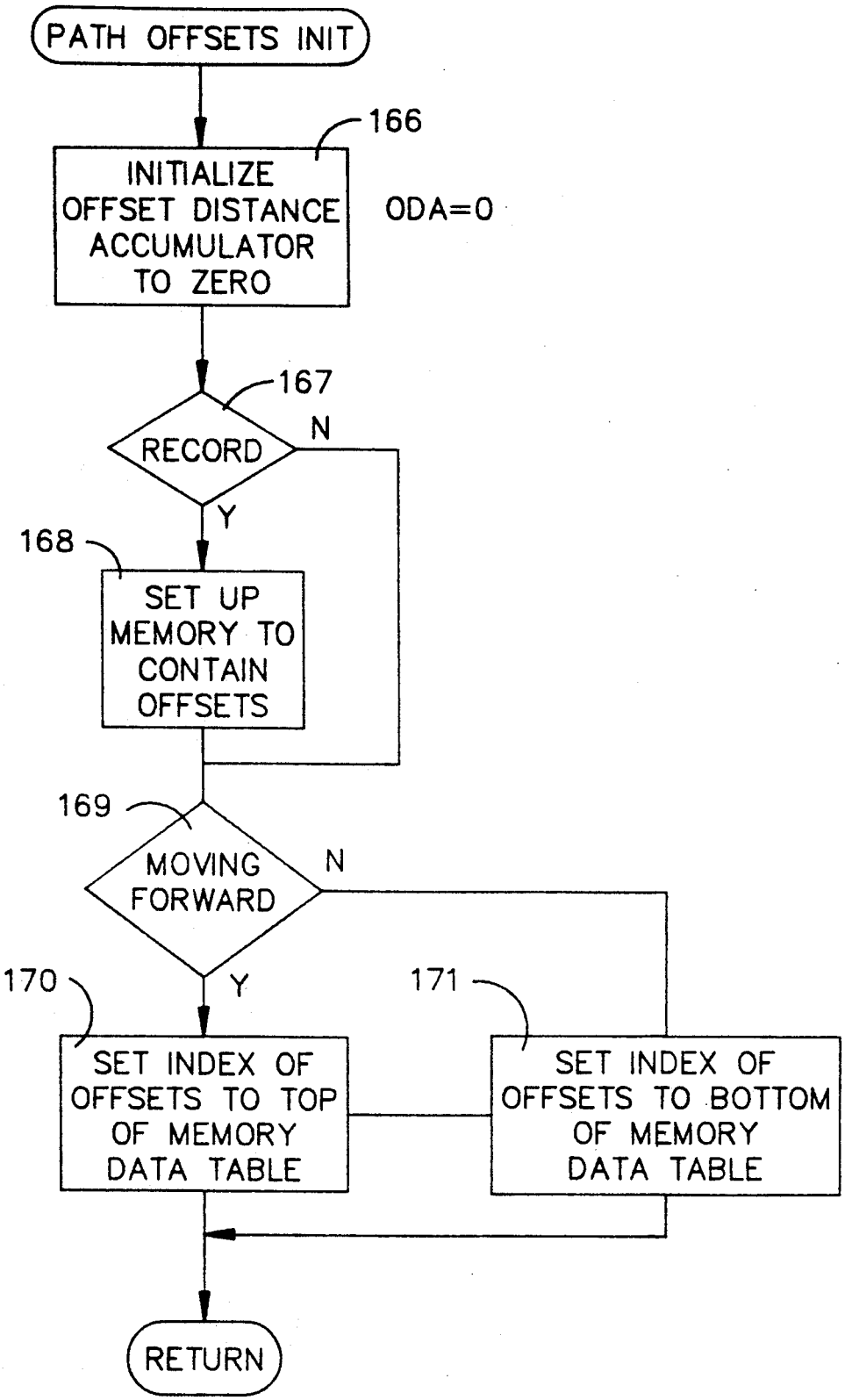
FIG. 14 is a flow chart of the initializing subroutine of FIG. 7.

At process step 166 of FIG. 14, the offset distance accumulator is initialized or set to zero. It will be understood that the offset distance accumulator resets to zero after each offset is recorded.

At decision step 167, it is determined whether offsets are to be recorded as in the instance of an initial seam-tracked pass, or not, as in the instance of subsequent passes. If the "yes" branch is followed, then a portion of data store 50 of memory 46 (see FIG. 2) is set aside and automatically cleared to serve as the memory data table for the memorized offsets, at step 168. From process step 168, the flow chart proceeds to decision step 169. If at decision step 167 the "no" path is followed, it leads directly to decision step 169.

At decision step 169, it is determined whether or not this particular pass is to be traversed in the forward direction. If the "yes" path is followed, process step 170 sets the index of offsets to the top of the memory data table. If the "no" path is followed, then process step 171 sets the index of offsets to the bottom of memory data table. Process step 170 or process step 171 having been performed, this subroutine is completed and the flow chart of FIG. 7 is re-entered just ahead of process step 95.

When that portion of data store 50 of memory 46, reserved and cleared to serve as the offsets memory data table, is no longer being used for that purpose, it will be restored to data store 50 to be used for other purposes, as part of the delete operation 163.

The path offsets memorize and recall subroutine is illustrated in FIG. 15. It will be remembered that this subroutine is called for at step 129a in the subroutine of FIG. 11. The subroutine of FIG. 15, like the subroutine of FIG. 14, is performed in the automode. The subroutine of FIG. 15 is repeated every minispan.

At process step 172, the offset distance accumulator 165 is incremented by the distance moved by the manipulator arm during the particular minispan under consideration. Process step 172 leads to decision step 173. At decision step 173, it is determined whether the accumulated distance in the offset distance accumulator is equal to or slightly greater than the programmed offsets interval distance. If it is not, this subroutine is completed and the process is returned to the subroutine of FIG. 11, just ahead of process step 130. If the accumulated distance is equal to or slightly greater than the programmed offset interval distance, then the process passes to decision step 174 where it is determined whether the offset is to be memorized (as in an initial or root seam-tracked pass) or recalled (as in a subsequent pass). If the offset is to be memorized, the current sensor offset is entered into the memory data table reserved from data store 50 of memory 46, in process step 175. If the offset is to be recalled, in step 176 the offset will be retrieved from the memory data table and added to the manipulator arm position.

Following either process step 175 or process step 176, the offset distance accumulator is reset to zero in step 177, ready to start looking for the next offset position. In process step 178, the memory data table is incremented to the next position to which the next offset will be added, or from which the next offset will be retrieved, depending upon the nature of the pass being performed.

FIG. 16 is a diagrammatic representation of path offsets. In FIG. 16, a programmed path of travel for the center point of the welding tool is shown from $P_0$ to $P_1$. The programmed path $P_0-P_1$ is divided into a plurality of minispans M. It will be noted that while there is a uniform 15 millisecond time duration between minispans, the distance covered between minispans is not necessarily uniform. It will be noted from FIG. 16 that the distance along programmed path $P_0-P_1$ increases for the first five minispans and thereafter becomes uniform, ultimately decreasing near the end $P_1$ of the programmed path. This indicates that the manipulator arm is accelerating through the first five minispans, whereupon it reaches the programmed velocity. At the last five minispans near the end $P_1$ of the programmed path, deceleration occurs.

For purposes of an exemplary showing, it will be assumed that the manipulator operator entered an offset distance interval of 0.48 inches at process step 152 of FIG. 13. Starting at the beginning of $P_0$ of the preprogrammed path, as the manipulator arm traverses the path, the offset distance accumulator will begin counting the distances between minispans. The first programmed offset distance interval ($PODI_1$) occurs just short of the eighth minispan. The offset distance accumulator will round off to the next nearest minispan (the eighth minispan in FIG. 16) and the first offset will be recorded there having an actual offset distance interval $ODI_1$. The offset distance accumulator will be set to zero and will again start counting distances between minispans to locate the next offset distance interval ($ODI_2$). The programmed second offset distance interval will be found this time after four minispans. The offset distance accumulator will round off to the fifth minispan and the second offset will be recorded at $ODI_2$. In a similar fashion, the third offset will be recorded at $ODI_3$. It will be noted that each offset will be maintained until the next offset is recorded.

FIG. 17 is a diagrammatic representation of the memory data table (constituting a designated part of data store 50 of memory 46 in FIG. 2), in which the offsets are recorded. In the first column of data table 179 the offsets $ODI_1$, $ODI_2$, and $ODI_3$ are identified. In the second column the offset distance interval for each is recorded. In the third, fourth and fifth columns, the X, Y, Z world coordinates for each are recorded. The final column of memory data table 179 and the final entry in column 1 thereof is a special offset distance interval to be described hereinafter.

Reference is now made to FIGS. 13, 16 and 17. Assuming that an initial or root seam-tracked pass has been made, and the offsets have been entered in table 179, if a subsequent pass has been programmed in FIG. 13 to be made in the same direction as the initial pass (process step 160 of FIG. 15), this subsequent pass can be executed with the offsets recalled from table 179 in the same order as they were entered. In other words, the index of offsets is set to the top of table 179 in process step 170 of the subroutine of FIG. 14. If, on the other hand, it was programmed in process step 160 of FIG. 13 that the subsequent pass be performed in a direction opposite that of the initial pass, the offsets will have to be recalled from table 179 in an order opposite the order in which they were entered into the table. Thus, the index of offsets will be set to the bottom of table 179 in process step 171 of FIG. 14.

Turning to FIG. 16, the first offset derived from table 179 will be that one occurring at $ODI_3$. In order that this offset be recalled at the proper position during the subsequent pass, it is necessary to know what that position is. Therefore, at the end of the seam tracking initial pass, the distance $X_1-ODI_3$ was entered in the column marked SPECIAL ODI. Once the first offset is recalled at its proper position, the others will be recalled at their proper positions at $ODI_2$ and $ODI_1$, without difficulty.

Thus far in the description of the invention, path offsets have been discussed at length. It is also necessary to provide point offsets as well. This is illustrated in FIG. 18. FIG. 18 shows a V-shaped seam between two adjacent work pieces 180 and 181. It will be assumed that during the initial or root seam-tracked pass a weld bead 182 was laid. For this initial pass, the programmed path had a starting point $P_1$ and an ending point $P_2$ (not shown). During a subsequent pass a second weld bead 183 was laid. For this pass, the programmed path to which the recalled offsets are added had a beginning point $P_3$ with an ending point $P_4$ (not shown). In a third and final pass, a third weld bead 184 was laid. The programmed path to which recalled offsets were added for this pass had a starting point $P_5$ and an ending point $P_6$ (not shown).

It will be apparent from FIG. 18 that the beginning point $P_3$ of the programmed path for the second pass has been offset upwardly as viewed in FIG. 18 to accommodate the first weld bead 182. It will be understood that end point $P_4$ is similarly offset. The starting point of the programmed path for the third pass $P_5$ and the ending point $P_6$ were, again vertically offset to accommodate weld bead 183.

Three methods currently exist for generating the start point offsets for multipass operation. The first is via the operator actuated pendant, in that the manipulator operator positions the tool centerpoint to the required positions, and programs those as absolute points. In the second method, the operator programs all succeeding passes identically as the root pass, except before executing these successive passes, the program will be set up to automatically turn on a different load point offset register for each pass. These registers will therefore adjust the start and end points of each pass with values entered by the operator at programming time. Point offsets are programmed in the teach mode (at 49 in FIG. 2) and are executed in the automode (at 104 in FIG. 7) much the same as path offsets (FIG. 13) which was described above. The third method would be programmed similar to the second except that the operator would not load the registers during teach mode programming.

In FIG. 18, the V-shaped seam is narrow enough that each weld bead is capable of extending from side-to-side thereof. FIG. 19 illustrates a wide V seam between two work pieces 185 and 186. The seam is of such character that, in the exemplary instance shown, six weld beads are required to fill it. In this instance, starting point $P_3$ is offset upwardly and to the left of starting point $P_1$, as viewed in the figure. Starting point $P_5$ is offset upwardly and to the right. Starting point $P_7$ is offset upwardly only, while starting point $P_9$ is offset upwardly and to the left and starting point $P_{11}$ is offset upwardly and to the right.

The present invention incorporates unique features which provide the manipulator operator with an exceptional degree of flexibility for both memorizing and recalling the offsets generated. For example, once an initial or root seam-tracked pass has been performed, the operator can use the pendant in the teach mode to go through a test run to check the accuracy of the recalled offsets.

A file storage media is available so that the offsets can be saved on a data disk by means of the bulk data transceiver 83 (see FIG. 2).

Another important feature of the present invention lies in the fact that the velocity can be modified without significant error in the offset distance interval positions. The operator can cycle through as many "learning passes" as are needed. The velocity of these passes can be moderately slow to allow accurate offsets to be memorized. When the correct path offsets have been saved, the operator may increase the velocity during subsequent passes using recalled offsets to greatly decrease the welding time.

As was indicated above, the offset distance interval can be changed at a program point. Depending upon the nature of the seam, this would permit a savings of memory capacity.

By memorizing offsets at specified distance positions, flexibility is obtained in the recall paths. Since distance attributes are set up by the operator for each memorized or recalled pass, the operator can either lengthen or shorten the offset distance interval in succeeding passes. An example of this can be found in welding about a curved surface. During the initial or root pass, seam-track offsets are memorized at each specified distance position. When planning the recall pass, the operator must take into consideration that the radius around the curved surface has increased by the distance of the weld puddled depth of the root pass. By increasing the offsets distance interval, the recall pass compensates for this increased radius. Similarly, when welding an inside curved surface, during the root pass the radius around the curved surface decreases because of the weld puddle depth of the root pass. By decreasing the offsets distance interval, the recall pass will compensate for the decreased radius.

The invention having been described in detail, modifications may be made therein without departing from the spirit of it.

What is claimed is:

1. In a method for controlling motion of a tool center point along a predetermined path between two predetermined points, the tool center point being associated with a function element carried by a manipulator and the motion being effected by repeated production of intermediate point coordinate signals representing intermediate points along the predetermined path and translation by the manipulator of the tool center point from one intermediate point to another, the improvement comprising the steps of:
    a. producing coordinate adjust signals during an initial pass of the tool center point along the predetermined path, the coordinate adjust signals representing coordinate offset values equal to a displacement of a desired location of the tool center point from an intermediate point;
    b. periodically memorizing the coordinate adjust signals at a predetermined distance interval measured along the predetermined path; and
    c. during a subsequent pass along the predetermined path, modifying the intermediate point coordinate signals in response to the memorized coordinate adjust signals to cause the tool center point to traverse a desired path displaced from the predetermined path.

2. The method of claim 1 wherein the step of producing coordinate adjust signals further comprises:
    a. sensing a location of the desired path; and
    b. periodically producing coordinate adjust signals in response to the sensed location of the desired path.

3. The method of claim 2 wherein the motion of the tool center point during the subsequent pass along the predetermined path is effected in the same direction as the motion during the initial pass.

4. The method of claim 2 wherein the motion of the tool center point during the subsequent pass along the predetermined path is in the opposite direction as the motion during the initial pass.

5. The method of claim 1 wherein the tool center point motion occurs at a first velocity during the initial pass and at a second velocity, different from the first velocity, during the subsequent pass.

6. In an apparatus for controlling motion of a tool center point along a predetermined path between two programmed points, the tool center point being associated with a function element carried by a manipulator and the motion being effected by repeated production of intermediate point coordinate signals representing intermediate points along the predetermined path and translation by the manipulator of the tool center point from one intermediate point to another, the improvement comprising:

a. means for producing coordinate adjust signals during an initial pass of the tool center point along the predetermined path, the coordinate adjust signals representing coordinate offset values equal to a displacement of a desired location of the tool center point from an intermediate point;
 b. means for periodically memorizing the coordinate adjust signals at a predetermined distance interval measured along the predetermined path; and
 c. means for modifying intermediate point coordinate signals in response to the memorized coordinate adjust signals during a subsequent pass of the tool center point along the predetermined path, the tool center point being caused to traverse a desired path displaced from the predetermined path in response to the intermediate point coordinate signals as modified.

7. The apparatus of claim 6 wherein the means for modifying intermediate point coordinate signals further comprises:

a. means for recalling the recorded coordinate adjust signals in the same sequence in which they were memorized when the subsequent pass is in the same direction as the initial pass; and
 b. means for recalling the recorded coordinate adjust signals in the reverse sequence as that in which they were memorized when the subsequent pass is in the opposite direction as the initial pass.

8. The apparatus of claim 6 wherein the means for producing coordinate adjust signals further comprises:

a. means for sensing a location of the desired path; and
 b. means for periodically producing coordinate adjust signals in response to the sensed location of the desired path.

9. The apparatus of claim 8 wherein the function element is a welding tool and the desired path is a seam to be welded.

10. The apparatus of claim 9 wherein the sensing means detects the centerline of the seam to be welded.

* * * * *